United States Patent
Lo

(10) Patent No.: US 10,114,421 B2
(45) Date of Patent: Oct. 30, 2018

(54) ELECTRONIC DEVICE

(71) Applicant: PEGATRON CORPORATION, Taipei (TW)

(72) Inventor: Chien-Sheng Lo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/856,549

(22) Filed: Dec. 28, 2017

(65) Prior Publication Data

US 2018/0275722 A1    Sep. 27, 2018

(30) Foreign Application Priority Data

Mar. 23, 2017  (TW) .............................. 106109797 A

(51) Int. Cl.
*H05K 5/00*  (2006.01)
*G06F 1/16*  (2006.01)
*H04M 1/02*  (2006.01)

(52) U.S. Cl.
CPC .......... *G06F 1/1652* (2013.01); *G06F 1/1679* (2013.01); *H04M 1/02* (2013.01)

(58) Field of Classification Search
CPC .... G06F 1/1681; G06F 1/1616; G06F 1/1618; G06F 1/1652; G06F 3/041; G06F 2203/04102; H04M 1/0216; H04M 1/0237; H04M 1/0268
See application file for complete search history.

(56) References Cited

U.S. PATENT DOCUMENTS

| | | | |
|---|---|---|---|
| 9,274,560 B2 | 3/2016 | Ahn | |
| 2013/0120106 A1* | 5/2013 | Cauwels | G06F 1/163 340/3.1 |
| 2016/0357222 A1* | 12/2016 | Seo | G06F 1/1652 |
| 2017/0199712 A1* | 7/2017 | Lee | G01B 7/22 |
| 2017/0235341 A1* | 8/2017 | Huitema | G06F 1/163 361/679.03 |
| 2017/0359915 A1* | 12/2017 | Yang | G09F 9/00 |
| 2018/0132738 A1* | 5/2018 | Choi | A61B 5/02438 |

(Continued)

FOREIGN PATENT DOCUMENTS

| CN | 102917090 A | 2/2013 |
|---|---|---|
| CN | 103514812 A | 1/2014 |
| CN | 105763684 A | 7/2016 |

*Primary Examiner* — Yuriy Semenenko

(74) *Attorney, Agent, or Firm* — McClure, Qualey & Rodack, LLP

(57) ABSTRACT

An electronic device includes a case. The case includes a plurality of first components and a plurality of second components. The first components and the second components are arranged alternately and pivotally each other. Each of the first components includes an accommodating slot. Each of the second components includes a connecting part, one or more curved parts, and one or more protrusions. The curved part is connected to the connecting part and received in the accommodating slot of the adjacent first component. The protrusion is arranged at a side of the curved part. When the case is bent, the first component and the second component could correspondingly pivot. The first component is capable of moving relative to the second component between the connecting part and the protrusion so that the curved part leaves the accommodating slot or receives in the accommodating slot.

11 Claims, 7 Drawing Sheets

(56) References Cited

U.S. PATENT DOCUMENTS

2018/0144113 A1* 5/2018 Cho .................... G02B 6/0011
2018/0150112 A1* 5/2018 Aoki ................... G06F 1/1652
2018/0192893 A1* 7/2018 Magi ................... A61B 5/0205

* cited by examiner

ELECTRONIC DEVICE

CROSS-REFERENCE TO RELATED APPLICATION

This non-provisional application claims priority under 35 U.S.C. § 119(a) to Patent Application No. 106109797 filed in Taiwan, R.O.C. on Mar. 23, 2017, the entire contents of which are hereby incorporated by reference.

BACKGROUND

Related Field

The instant disclosure relates to an electronic device, in particular, to a flexible electronic device having a flexible display.

Related Art

As the development of smart electronic devices, modern electronic devices have been developed to use touch-display panels as the display interface and the main control component, which replaces the configuration of the physical key or button. Additionally, since flexible touch-display panels have been provided, the touch-display panel of the electronic device (such as a notebook, a mobile phone, a wearable device, etc.) can be bent to a certain degree and the size of the touch-display panel is no longer limited. A wearable device (such as a watch) may adopt the flexible touch-display panel, which makes the watch be bent to fit the wrist shape of the user for wearing and expends the area of the flexible touch-display panel, wherein the flexible touch-display panel is used as the watch surface. Accordingly, the user can operate the watch more conveniently and avoid inconvenient operation caused by the limited watch surface.

SUMMARY

The case which is assembled with the flexible touch-display panel and the at least one flexible circuit board which is arranged in the case also need to be able to be bent with the panel in order to fully apply the characteristics and functions of the flexible touch-display.

In one embodiment, an electronic device comprises a case, a flexible display panel, and at least one flexible circuit board. The case comprises a plurality of first components and a plurality of second components. The first components and the second components are arranged alternately and pivoted each other. The first component comprises an accommodating slot, and the second component comprises a connecting part, at least one curved part, and at least one protrusion. The curved part is connected to the connecting part and received in the accommodating slot of the adjacent first component, and the protrusion is arranged at a side of the curved part opposite to a side connected to the connecting part. The first component and the second component are capable of pivoting in response to bending of the case to make the first component move relative to the second component between the connecting part and the protrusion to change a region where the curved part is received in the accommodating slot. The flexible display panel is assembled with the case. At least one flexible circuit board is electrically connected to the flexible display panel and arranged in the case.

By the pivoting of the first component and the second component, the case provides a flexible structure. Accordingly, when the case works with a flexible display panel, the whole electronic device can be bent, which shows the advantages and characteristics of the flexible display panel. On the other hand, the length and width of the first component and second component can be modified to form a variety of sizes of the electronic device case, which makes the design and application more convenient. The circuit board arranged in the case is a flexible circuit board so that the electronic device can be bent.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
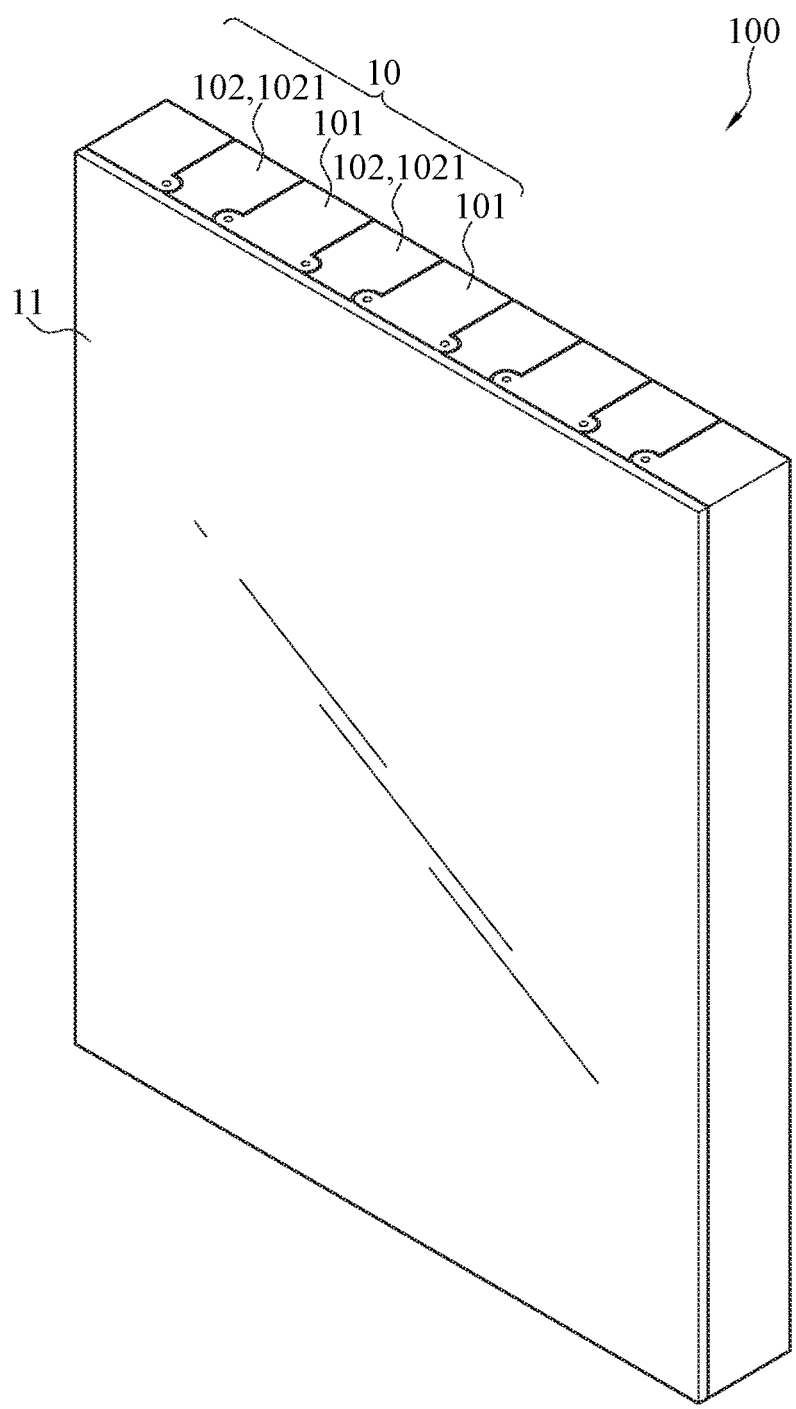
FIG. 1 illustrates an electronic device according to a first embodiment of the instant disclosure.
Figure 2:
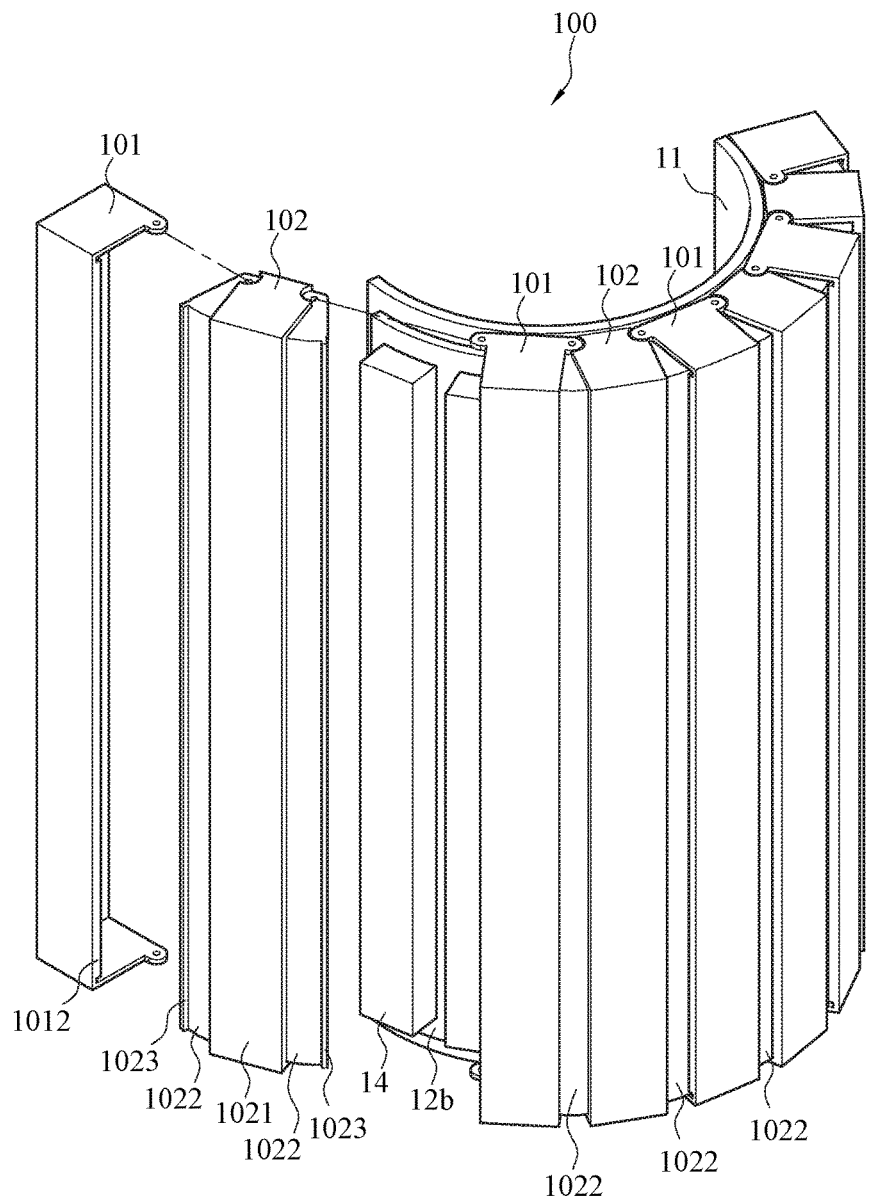
FIG. 2 illustrates a bending state of the electronic device in the first embodiment.
Figure 3:
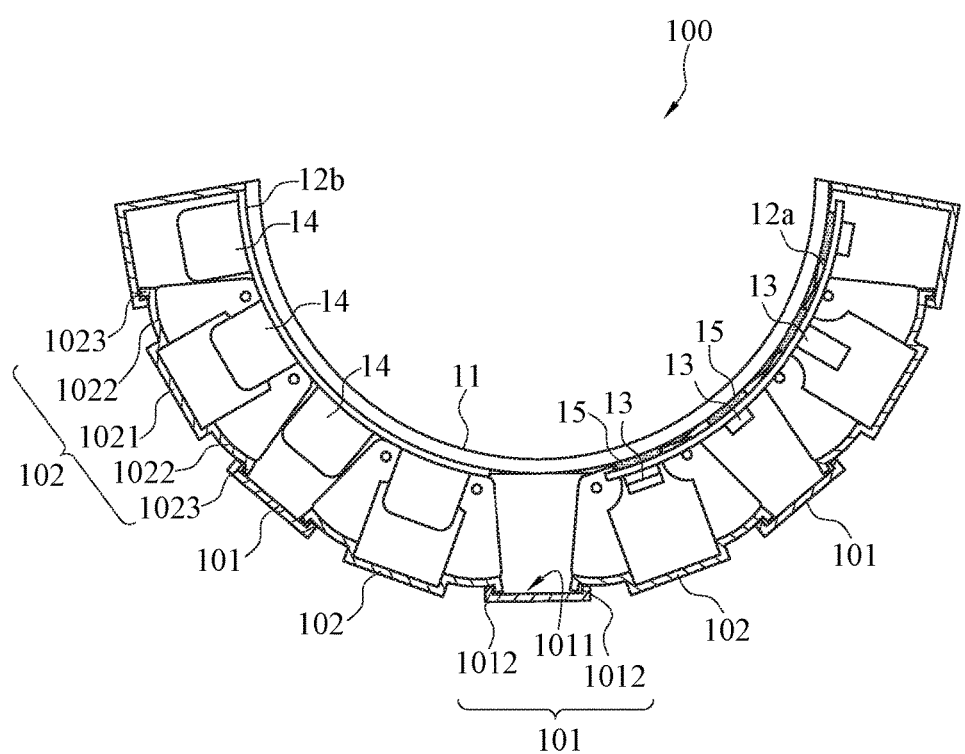
FIG. 3 illustrates a cross-sectional diagram of the electronic device in the first embodiment.

Referring to FIGS. 1-3, FIG. 1 illustrates an electronic device according to the first embodiment of the instant disclosure; FIG. 2 illustrates the schematic diagram of the bended electronic device in the first embodiment; and FIG. 3 illustrates the cross-sectional diagram of the bended electronic device of the first embodiment. The electronic device 100 of this embodiment includes a case 10, a flexible display panel 11 and a flexible circuit board. The flexible display panel 11 is assembled with the case 10. In this embodiment, the backplane of the flexible display panel 11 is combined with the whole case 10, which makes the electronic device 100 have the maximum display area and the minimum volume as much as possible, however, the instant disclosure is not limited thereto. In some embodiments, the case 10 may larger than the display area of the flexible display panel.

Referring to FIGS. 1-3, in this embodiment, the case 10 includes a plurality of first components 101 and a plurality of second components 102. In some embodiments, only a portion of the case 10 includes the first component 101 and the second component 102 so that the portion of the case 10 is bendable, and the instant disclosure is not limited thereto. As shown in FIG. 1 and FIG. 2, the first component 101 and the second component 102 are of the bar shape, and the side view of each of the first and second components is substantial of U shape so that the case 10 assembled by the first and second components 101, 102 has an accommodating space. The first components 101 and the second components 102 are arranged alternately, and the first components 101 are pivoted to the adjacent second components 102 in sequence. In other words, while assembling the case 10, one first component 101 is pivoted to one second component 102, and then said one second component 102 is pivoted to another first component 101. Accordingly, the first components 101 and second components 102 are arranged alternately in sequence to form the case 10. Based on the mentioned assembling technique, the number of the first component 101 and second component 102 can be determined by the required size of the case 10, so that the case 10 can be applied to electronic devices with different sizes. When the assembling of the case 10 is completed, the first components 101 and the second components 102 are capable of pivoting in response to the bending of the case 10. The first component 101 includes an accommodating slot 1011. As shown in FIG. 3, the accommodating slot 101 is arranged at the inner side of the first component 101.

The second component 102 may include a connecting part 1021, at least one curved part 1022, and at least one protrusion 1023. The curved part 1022 is connected to the connecting part 1021 and received in the accommodating slot 1011 of the adjacent first component 101. The protrusion 1023 is arranged at the side of the curved part 1022 opposite to a side connected to the connecting part 1021. As show in FIG. 2 and FIG. 3, in this embodiment, the second component 102 has two curved parts 1022 and two protrusions 1023. The two curved parts 1022 are respectively arranged at opposite sides of the connecting part 1021, and the protrusion 1023 is arranged at the side of the curved part 1022 opposite to the side connected to the connecting part 1021. That is, the connecting parts 1021 and the protrusions 1023 are on the opposite sides of the curved part 1022.

As shown in FIG. 2, each of the two protrusions 1023 of this embodiment is disposed along the long side of the curved part 1022 and extended over the entire long side. In some embodiments, a plurality of protrusions 1023 are set at the long side of the curved part 1022, and the protrusions 1023 are set apart from each other with a predetermined distance. In some embodiments, a single protrusion 1023 can be placed at any position of the long side of the curved part 1022.

When the case 10 is bent, the first component 101 and second component 102 are capable of pivoting in response to the bending of the case 10. Accordingly, the first component 101 moves relative to the second component 102 and moves between the connecting part 1021 and the protrusion 1023 to change the region (which is received in the accommodating slot 1011) of the curved part 1022. For example, the curved part 1022 is received or forced to move away from the accommodating slot 1011.

FIG. 1 illustrates the embodiment that the curved part 1022 is received in the accommodating slot 1011, that is, the case 10 is not bent. Since the curved part 1022 is received in the accommodating slot 1011, FIG. 1 only shows the exterior surfaces of the first component 101 and the connecting part 1021 of the second components 102. The accommodating slot 1011 of the first component 101 is not shown, and the curved part 1022 and the protrusion 1023 (which are covered by the first component and received in the accommodating slot 1011) of the second component 102 are not shown, either. When the case 10 is not bent, the first components 101 abuts against the connecting parts 1021 of the adjacent second components 102 in order to form the case 10.

When the flexible display panel 11 is bent, the case 10 is bent in response to the bent flexible display panel, as shown in FIG. 2. Referring to the cross-sectional diagram shown in FIG. 3, when the case 10 is bent, the first components 101 and the second components 102 are capable of pivoting based on the pivot spot in response to the bending of the case 10. Accordingly, the first component 101 moves between the connecting part 1021 and the protrusion 1023 relative to the second component 102 and moves away from the connecting part 1021, so that the first component 101 and second component 102 move in opposite directions to make the curved part 1022 gradually separates from the accommodating slot 1011 until the protrusion 1023 abuts against the side wall 1012 of the corresponding accommodating slot 1011. In this embodiment, the accommodating slot 1011 may have side walls 1012 on both opposite sides for abutting against the corresponding protrusions 1023. In that cases, the curved part 1022 is exposed between the first component 101 and the connecting part 1021 of the second component 102.

Taking one set of the first component 101 and second component 102 for example, the bended case 10 makes the first component 101 pivot in opposite directions relative to the second component 102. In that cases, the first component 101 moves between the connecting part 1021 and the protrusion 1023 relative to the second component 102 and moves away from the connecting part 1021, so that the first component 101 and second component 102 move in opposite directions to make the curved part 1022 of the second component 102 gradually separates from the accommodating slot 1011 and gradually be exposed to the region between the first component 101 and the connecting part 1021. The first component 101 can keep moving until the protrusion 1023 of the second component 102 abuts against the side wall 1012 corresponding to the accommodating slot 1011 of the first component 101. In that cases, the configuration of the curved part 1022 can cover the space between the first component 101 and the connecting part 1021 of the second component 102, wherein the space is generated by the relative movement of the first component 101 and second component 102. Accordingly, the bended case 10 can still be a closed case.

When the case 10 is operated from the bending state (as shown in FIG. 2 and FIG. 3) to the non-bending state (as shown in FIG. 1), the operation starts from the condition that the protrusion 1023 abuts against the side wall 1012 of the corresponding accommodating slot 1011. The first component 101 and second component 102 may pivot again in response to the bending of the case 10. In that cases, the first component 101 moves relative to the second component 102 and moves away from the protrusion 1023. The first component 101 and second component 102 move in opposite directions, so that the curved part 1022 is gradually received in the accommodating slot 1011 until the first component 101 abuts against the connecting part 1021 of the adjacent second component.

Due to the pivoting of the first component 101 and second component 102, the case 10 is bendable, and the case 10 still can form a closed case in the bending state. The case 10 can be utilized with the flexible display panel 11 and the flexible circuit board to perform the application of bending mode, which shows the advantages and characteristics of the flexible display panel 11. By adjusting the length and width of the first component 101 and second component 102, it is possible to form a variety of sizes of the case 10 for the electronic device 100, which makes the design and application more convenient.

Referring to FIG. 2 and FIG. 3, in this embodiment, the flexible circuit board includes a first flexible circuit board 12*a* and a second flexible circuit board 12*b*. Since the flexible circuit board is bendable and can be electrically connected to various electronic components, the flexible circuit board can be connected to the electronic devices such as the flexible display panel 11, electronic components 13, battery 14, etc. As shown in FIG. 3, the first flexible circuit board 12a and the second flexible circuit board 12b are arranged separately. The first flexible circuit board 12a is electrically connected to a plurality of electronic components 13, and the second flexible circuit board 12b is electrically connected to a plurality of batteries 14. The electronic components 13 are the electronic elements used by the electronic device 100, such as processor, memory, capacitor, resistor, inductor, etc.

In some embodiments, a single flexible circuit board may be connect to the electronic component 13 and battery 14. Furthermore, for the purpose of making the first flexible circuit board 12a and second flexible circuit board 12b be able to work with the flexible display panel 11 for bending operation, the arrangement and positions of the electronic components 13 and the size, shape, arrangement, and positions of the batteries 14 are designed and placed corresponding to the shape and size of the accommodating slot 1011 of the first component 101 and the connecting part 1021 of the second component 102. For example, a plurality of bar-shape batteries 14 with small size may be utilized in the electronic device 100 to provide the required power.

Referring to FIG. 3, in this embodiment, the electronic device 100 may further include a plurality of support components 15. The support components 15 are separately placed on one side (which is electrically connected to the flexible display panel 11) of the first flexible circuit board 12a and received in the case 10. The electronic components 13 are set on the side of the first flexible circuit board 12a opposite to a first side of the first flexible circuit board 12a, wherein the support components 15 are set on the first side. The positions of the electronic components 13 correspond to positions of the support components 15. In this embodiment, the electronic components 13 are arranged corresponding to the support components 15, so that the electronic components 13 are supported and positioned based on the support components 15, which avoids the electronic components 13 being damaged when the first flexible circuit board 12a is bent. Moreover, for supporting the bending operation, each support component 15 can also be placed corresponding to the position of the accommodating slot 1011 of the first component 101 or the connecting part 1021 of the second component 102. Furthermore, in this embodiment, the battery 14 is set without using extra support component 15. However, in some embodiments, the support component 15 can be set corresponding to the battery 14.

Figure 4:
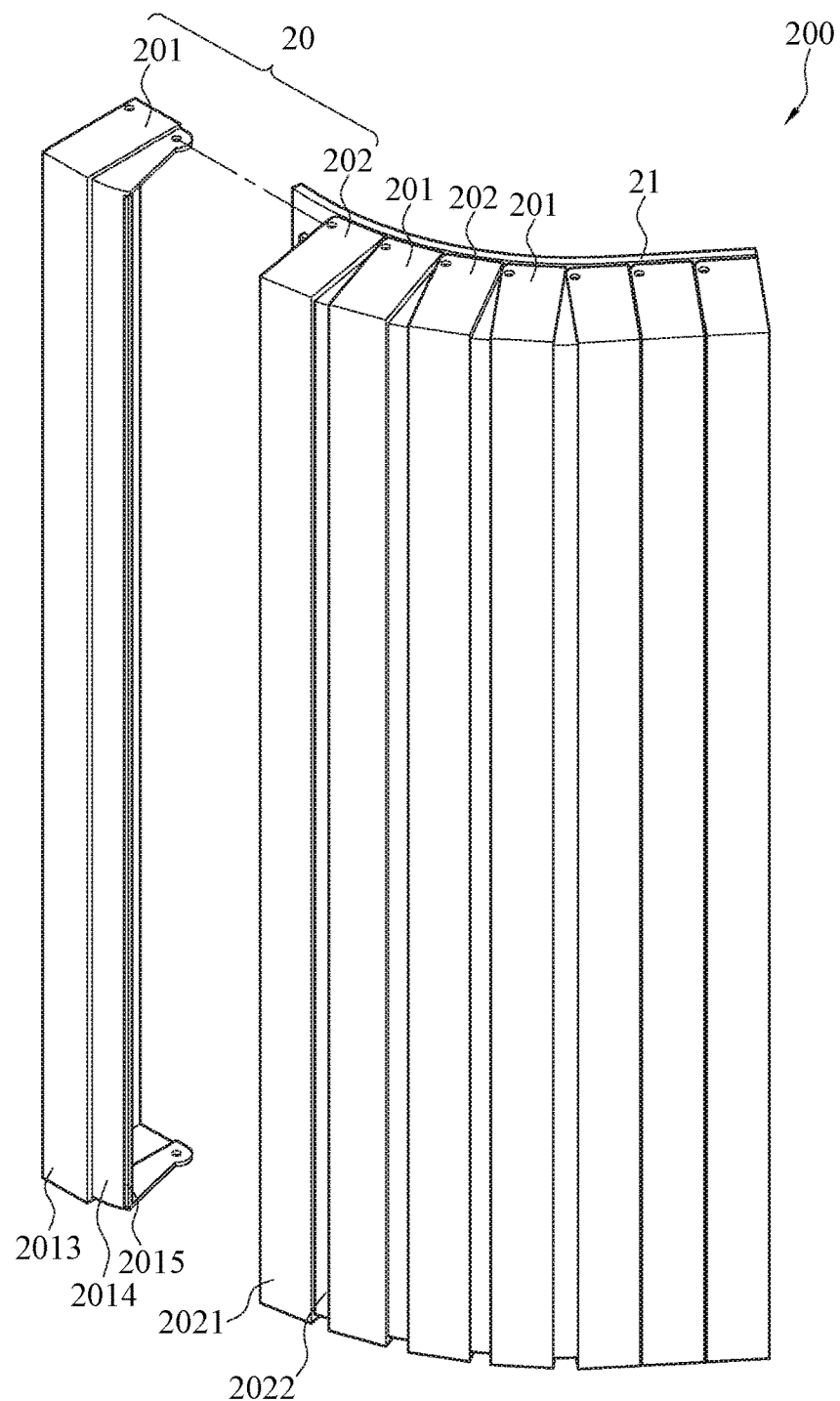
FIG. 4 illustrates a schematic diagram of an electronic device which is partially bent according to a second embodiment of the instant disclosure.
Figure 5:
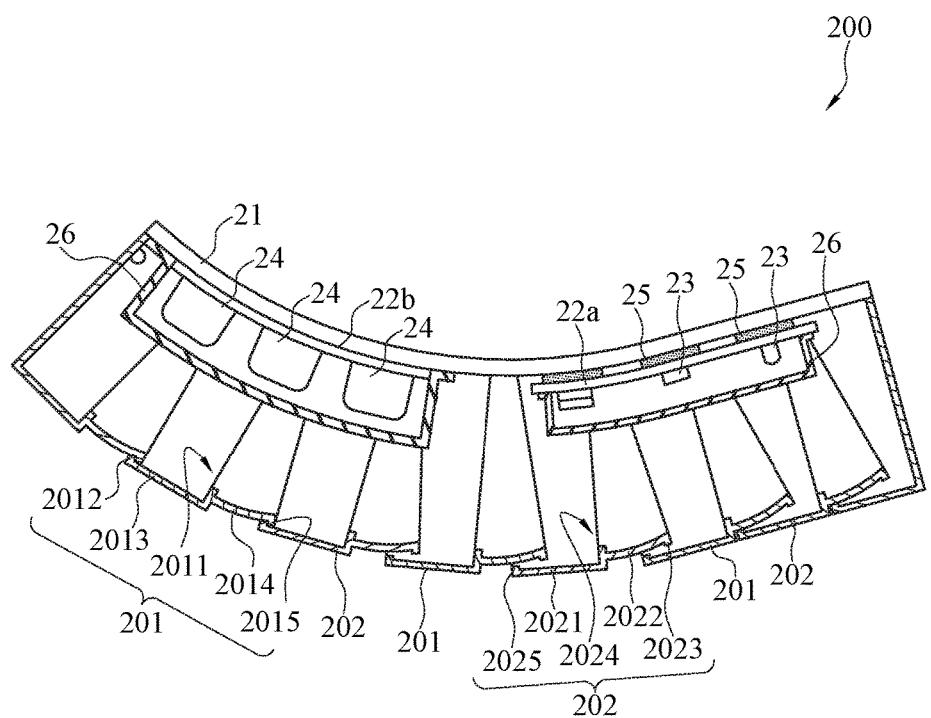
FIG. 5 illustrates a cross-sectional diagram of the electronic device in the second embodiment.

FIG. 4 and FIG. 5 respectively illustrate the schematic diagram and cross-sectional diagram of the electronic device which is in the partially bended state according to the second embodiment of the instant disclosure. The electronic device 200 in this embodiment includes a case 20, a flexible display panel 21, a first flexible circuit board 22a, a second flexible circuit 22b, a plurality of electronic components 23, a plurality of batteries 24, and a plurality of support components 25. The device structure and the connections between each elements of this embodiment are similar to the first embodiment, and the elements having the same connection configurations and arrangements are not described again. The differences between this embodiment and the first embodiment are described below.

As shown in FIG. 4 and FIG. 5, the first component 201 of this embodiment includes a connection part 2013, a curved part 2014, and a protrusion 2015. The connecting part 2013, curved part 2014, and protrusion 2015 of the first component 201 form an accommodating slot 2011. The curved part 2014 is connected to one side of the connecting part 2013. The protrusion 2015 is on the side of the curved part 2014 opposite to the side, which is connected to the connecting part 2013, of the curved part 2014. A side wall 2012 is on the side of the connecting part 2013 opposite to the side connected to the curved part 2014 of the connecting part 2013.

The second component 202 also includes the connecting part 2021, at least one curved part 2022, and at least one protrusion 2023. The curved part 2022 is connected to one side of the connecting part 2021. The protrusion 2023 is on the side of the curved part 2022 opposite to the side connected to the connecting part 2021 of the curved part 2022. The side wall 2025 is on the side of the connecting part 2021 opposite to the side connected to the curved part 2022 of the connecting part 2021. In this embodiment, the second component 202 has a single curved part 2022 and a single protrusion 2023. Similarly, the connecting part 2021, curved part 2022, and protrusion 2023 of the second component 202 form an accommodating slot 2024. As the cross-sectional diagram shown in FIG. 5, in this embodiment, the first component 201 and second component 202 have the same structure. That is, the structures of the first component 201 and second component 202 are identical, and the first components 201 and second components 202 are arranged alternately and pivoted to each other in sequence.

When the case 20 is in the condition shown in the right half of FIG. 4 or FIG. 5, that is, when the connecting part 2013 of the first component 201 abuts against the connecting part 2021 of the adjacent second component 202, the curved part 2022 of the second component 202 is received in the accommodating slot 2011 of the adjacent first component 201. When the case 20 is bent, the first component 201 and second component 202 are capable of pivoting in response to the bending of the case 20. In that cases, similar to the first embodiment, the bended case 20 makes the first component 201 move relative to the second component 202. Accordingly, the first component 201 and second component 202 move in opposite directions, so that the connecting part 2013 of the first component 201 moves away from the connecting part 2021 of the second component 202, and the curved part 2022 of the second component 202 moves away from the accommodating slot 2011 of the corresponding first component 201. The case 20 can be bent until the protrusion 2023 of the second component 202 abuts against the side wall 2012 of the accommodating slot 2011 of the corresponding first component 201, as shown in the left half of FIG. 5.

When the cased 20 is in the condition shown in the left half of FIG. 5, the protrusion 2023 of the second component 202 abuts against the side wall 2012 of the accommodating slot 2011 of the corresponding first component 201; when the case 20 is operated from the bending state to the non-bending state, the first component 201 and second component 202 are also capable of pivoting in response to the bending of the case 20. In that cases, the bending of the case 20 makes the first component 201 move relative to the second component 202, and the first component 201 and second component 202 move in opposite directions, so that the connecting part 2013 of the first component 201 move close to the connecting part 2021 of the second component 202. Accordingly, the curved part 2022 of the second component 202 is gradually received in the accommodating slot 2011 of the first component 201 until the connecting part 2013 of the first component 201 abuts against the connecting part 2021 of the adjacent second part 202 (as shown in the right half of FIG. 5).

Furthermore, in this embodiment, to improve the waterproof effect of the electronic components 23, batteries 24 and electronic elements of the electronic device 200, a plurality of soft waterproof covers 26 can be respectively utilized to cover the electronic components 23 and batteries 24. Accordingly, the electronic components 23 and batteries 24 are not directly damaged by liquid or moisture due to the protection provided by the soft waterproof cover 26. As shown in FIG. 5, there are two soft waterproof covers 26 in this embodiment. One soft waterproof cover 26 is placed on the first flexible circuit board 22a and configured to cover the electronic components 23. The other soft waterproof cover 26 is placed on the second flexible circuit board 22b, connected to the backplane of the flexible display panel 21, and configured to cover the second flexible circuit board 22b and batteries 24 at the same time. In some embodiments, a single soft waterproof cover 26 can be used to cover all electronic components 23 and batteries 24 at the same time. While operating the electronic device 200, the soft waterproof cover 26 has a certain degree of stretch and ductility and can be stretched in response to the bending of the case 20. In that cases, when the soft waterproof cover 26 is stretched, the soft waterproof cover 26 still can provide the waterproof effect. The electronic components 23, first flexible circuit board 22a, second flexible circuit board 22b, and batteries 24 covered by the soft waterproof cover 26 are not pulled or affected by the stretched soft waterproof cover 26 so that the soft waterproof cover 26 can provide the waterproof effect when the case 20 is bent.

Based on the structures described above, a plurality of the first components 201 and second components 202 having the same structure of this embodiment are pivoted to each other, which makes the case 20 have the bendable structure. The electronic elements (such as components 23) inside the case 20 are not exposed when the case 20 is bent, and the bended case 20 still provides a closed space. Since only one structure of the first component 201 and second component 202 is required to form the case 20, the complexity of the manufacturing procedure can be reduced during manufacturing the components. The complexity of the manufacturing procedure can also be reduced since the manufacturing procedure only needs to make components which have identical structure and are sequentially pivoted to each other.

Figure 6:
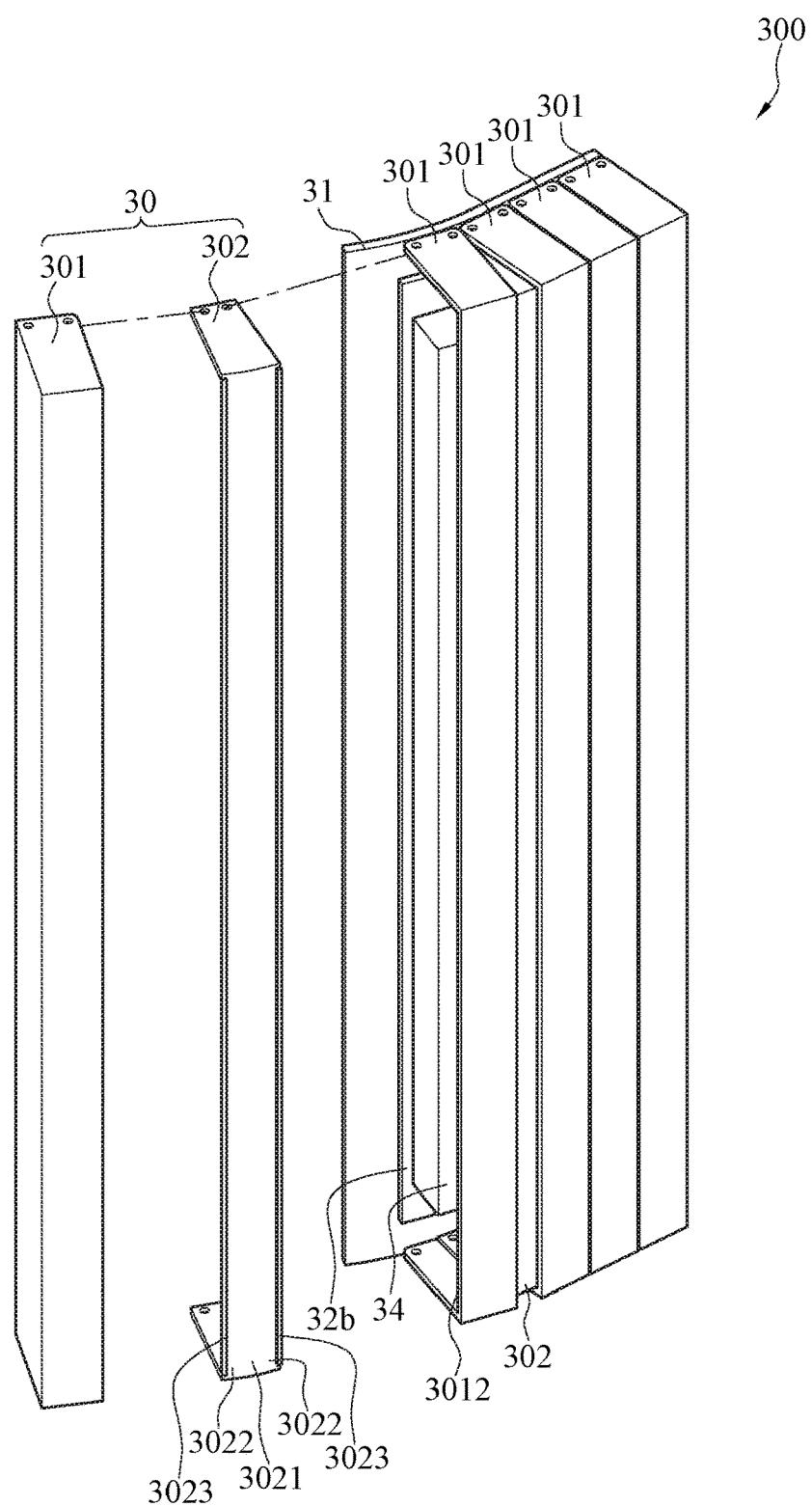
FIG. 6 illustrates a schematic diagram of an electronic device which is partially bent according to a third embodiment of the instant disclosure.
Figure 7:
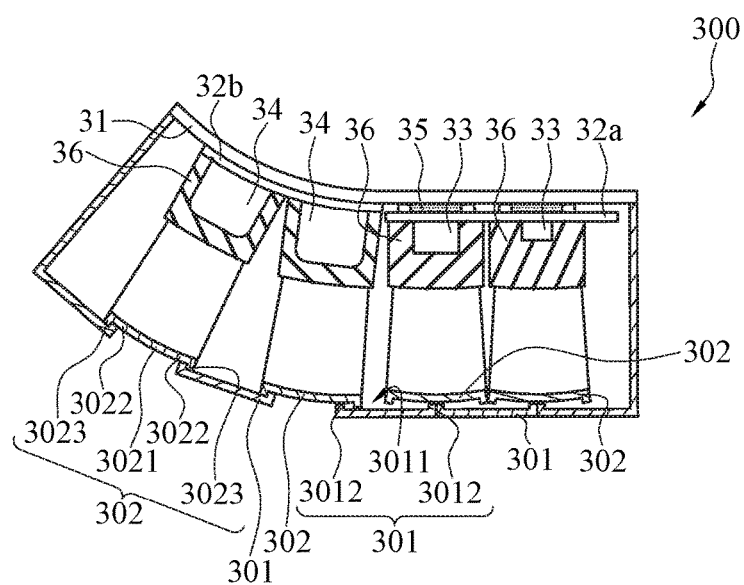
FIG. 7 illustrates a cross-sectional diagram of the electronic device in the third embodiment.

FIG. 6 and FIG. 7 respectively illustrate the schematic diagram and cross-sectional diagram of the electronic device which is in the partially bended state according to the third embodiment of the instant disclosure. The electronic device 300 in this embodiment includes a case 30, a flexible display panel 31, a first flexible circuit board 32a, a second flexible circuit 32b, a plurality of electronic components 33, a plurality of batteries 34, and a plurality of support components 35. The device structure and the connections between each element of this embodiment are similar to the first embodiment, and the elements having the same connection configurations and arrangements are not described again. The differences between this embodiment and the first embodiment are described below.

The first component 301 of this embodiment includes an accommodating slot 3011, and side walls 3012 are respectively placed on the opposite sides of the accommodating slot 3011. The second component 302 includes a connection part 3021, at least one curved part 3022, and at least one protrusion 3023. In this embodiment, the second component 302 has two curved parts 3022 and two protrusions 3023. The two curved parts 3022 are respectively arranged on the opposite sides of the connecting part 3021. The two protrusions 3023 are respectively placed on the two curved parts 3022, and each protrusion 3023 is on the side of the curved part 3022 opposite to the side connected to the connecting part 3021 of the curved part 3022.

The second component 302 of this embodiment and the second component 102 of the first embodiment both have curved parts arranged on two sides of the connecting part. The main difference between the second component 302 of this embodiment and the second component 102 of the first embodiment is that the connecting part 1021 of the first embodiment is a straight plate, and the curved parts 1022 are extended from two sides of the connecting part 1021. Moreover, according to FIGS. 1-3, the height of the curved part 1022 of the first embodiment is slightly lower than the height of the connecting part 1021 to generate a height difference. In that cases, after the first component 101 and second component 102 are assembled, since the height of the first component 101 is the same as that of the second component 102, the curved part 1022 of the second component can be received in the accommodating slot 1011, and the connecting part 1021 of the second component 102 is able to abut against the adjacent first component 101 and exposed. In this embodiment, the connecting part 3021 is slightly curved to match the bending angle of the curved part 3022, and the curved part 3022 and connecting part 3021 form a continuous curved plane without a height difference. Since the height of the first component 301 is slightly higher than the height of the connecting part 3021 and curved part 3022 of the second component 302, the connecting part 3021 and curved part 3022 of the second component 302 can be received in the accommodating slot 3011. When the case 30 is operated in the state shown in the right half of FIG. 6 and FIG. 7, that is, when the case 30 is not bent, the first component 301 abuts against the adjacent first component 301. The connecting part 3021, two curved parts 3022, and two protrusions 3023 of the second component 302 pivoted between the two adjacent first components 301 are received in the two accommodating slots 3011 of the two adjacent first components 301. In that cases, when the case 30 is not bent (as shown in the right half of FIG. 6 and FIG. 7), the second component 302 cannot be seen from the outside of the electronic device 300. The connecting part 3021, curved part 3022, and protrusion 3023 of the second component 302 are received in the two adjacent accommodating slots 3011. Only the first component 301 can be seen.

When the case 30 of the electronic device 300 is bent, the first component 301 and the second component 302 are capable of pivoting in response to the bending of the case 30. Accordingly, the first component 301 moves relative to the second component 302 and moves away from the connecting part 3021, so that the first component 301 and second component 302 move in opposite directions to make the connecting part 3021 and curved part 3022 gradually separate from the accommodating slot 3011 until the protrusion 3023 abuts against the side wall 3012 of the accommodating slot 3011 of the corresponding first component 301. In that cases, the connecting part 3021 and the curved part 3022 of the second component 302 are exposed to cover the space between the two adjacent first components 301, wherein the space is generated by the relative movement of the two adjacent first components 301. Accordingly, the bended case 30 still can be a closed case, as shown in the left half of FIG. 7.

When the case 30 is in the state as shown in the left half of FIG. 7, the protrusion 3023 abuts against the side wall 3012 of the accommodating slot 3011 of the corresponding first component 301. In that cases, when the case 30 of the bended electronic device 300 is operated from the bending state to the non-bending state, the first component 301 and second component 302 pivot again in response to the bending of the case 30. Accordingly, the first component 301 moves relative to the second component 302 and moves away from the protrusion 3023. The first component 301 and second component 302 move in opposite directions, so that the connecting part 3021, two curved parts 3022 and two protrusions 3023 of the second component 302 are gradually received in the two accommodating slots 3011 of two adjacent first components 301 until the first component 101 abuts against the adjacent first component 301, as shown in the right half of FIG. 7.

Furthermore, in this embodiment, to improve the waterproof effect of the electronic components 33, batteries 34, and electronic elements in the case 30, a plurality of soft waterproof layers 36 are arranged on the exterior of the electronic components 33 and batteries 34, as shown in FIG. 7. The soft waterproof layers 36 are respectively arranged on the first flexible circuit board 32a and second flexible circuit board 32b and configured to cover the electronic components 33 and batteries 34. In this embodiment, each electronic component 33 and battery 34 is respectively covered by the soft waterproof layer 36, so that it is easier to bend the electronic device 300. In some embodiments, the soft waterproof layer 36 may be utilized to simultaneously cover multiple electronic components 33 based on the assembling position. For example, the electronic components 33 in the region of one second component 302 are simultaneously covered by the soft waterproof layer 36. Accordingly, even when the electronic device 300 is bent, the components in the region of the second component 302 are not bent, and the soft waterproof layers 36 do not pull the electronic components 33 which are covered together. Since the soft waterproof layers 36 cover the electronic components 33 and batteries 34, the electronic components 33 or batteries 34 are not easily damaged even the liquid or moisture enters the case 30 through the space between the first component 301 and second component 302, which effectively performs the waterproof effect.

While the instant disclosure has been described with respect to a limited number of embodiments, those skilled in the art, having the benefit of the above description, will appreciate that other embodiments may be devised which do not depart from the scope of the instant disclosure as described herein. In addition, it should be noted that the language used in the instant disclosure has been principally selected for readability and instructional purposes, and may not have been selected to delineate or circumscribe the inventive subject matter. Accordingly, the embodiments of the instant disclosure introduced herein are intended to be illustrative, but not limiting, of the scope of the instant disclosure, which is set forth in the claims.

What is claimed is:

1. An electronic device, comprising:
   a case, comprising a plurality of first components and a plurality of second components; the first components and the second components arranged alternately and pivoted each other; the first component comprising an accommodating slot, and the second component comprising a connecting part, at least one curved part, and at least one protrusion; the curved part connected to the connecting part and received in the accommodating slot of the adjacent first component, and the protrusion arranged at a side of the curved part opposite to a side connected to the connecting part; the first component and the second component being capable of pivoting in response to bending of the case to make the first component move relative to the second component between the connecting part and the protrusion to change a region where the curved part is received in the accommodating slot;
   a flexible display panel, assembled with the case; and
   at least one flexible circuit board, electrically connected to the flexible display panel and arranged in the case.

2. The electronic device as claimed in claim 1, wherein the at least one flexible circuit board comprises a first flexible circuit board and a second flexible circuit board; the first flexible circuit board is electrically connected to a plurality of electronic components, and the second flexible circuit board is electrically connected to a plurality of batteries; the first flexible circuit board and the second flexible circuit board are arranged separately.

3. The electronic device as claimed in claim 2, further comprising a plurality of support components separately arranged at a side of the first flexible circuit board electrically connected to the flexible display panel, and the support components received in the case; wherein the electronic components are arranged at a side of the first flexible circuit board opposite to the side disposing the support components, and positions of the electronic components correspond to positions of the support components.

4. The electronic device as claimed in claim 2, further comprising a soft waterproof cover arranged at the flexible circuit board and utilized to cover the electronic components.

5. The electronic device as claimed in claim 2, further comprising a soft waterproof layer arranged at the flexible circuit board and covering the electronic components.

6. The electronic device as claimed in claim 1, wherein the number of the at least one curved part is two and the number of the at least one protrusion is two; wherein the two curved parts are respectively arranged at opposite sides of the connecting part; the first component abuts against the adjacent connecting part; the first component and the second component are capable of pivoting in response to bending of the case to make the first component move away from the connecting part, such that the curved part gradually separates from the accommodating slot until the protrusion abuts against a side wall of the corresponding accommodating slot.

7. The electronic device as claimed in claim 6, wherein the protrusion abuts against the side wall of the corresponding accommodating slot, the first component and the second component are capable of pivoting in response to bending of the case to make the first component move away from the protrusion, such that the curved part is gradually received in the accommodating slot until the first component abuts against the adjacent connecting part.

8. The electronic device as claimed in claim 1, wherein the first component further comprises a connecting part, a curved part, and a protrusion; the number of the at least one curved part of the second component is one and number of the at least one the protrusion of the second component is one; wherein the connecting part, the curved part and the protrusion of the first component and the connecting part, the curved part and the protrusion of the second component respectively form the accommodating slots; the connecting part of the first component abuts against the connecting part of the adjacent second component, the curved part of the second component is received in the accommodating slot of the adjacent first component; the first component and the second component are capable of pivoting in response to bending of the case to make the connecting part of the first component move away from the connecting part of the second component, such that the curved part of the second component gradually separates from the accommodating slot of the corresponding first component until the protrusion of the second component abuts against a side wall of the accommodating slot of the corresponding first component.

9. The electronic device as claimed in claim 8, wherein the protrusion of the second component abuts against the side wall of the accommodating slot of the corresponding first component, the first component and the second component are capable of pivoting in response to bending of the case to make the connecting part of the first component close to the connecting part of the second component and the curved part of the second component be gradually received in the accommodating slot of the first component until the connecting part of the first component abuts against the connecting part of the adjacent second component.

10. The electronic device as claimed in claim 1, wherein the number of the at least one curved part of the second component is two and the number of the at least one protrusion of the second component is two; the two curved parts are respectively arranged on opposite sides of the connecting part; the connecting part, the two curved parts, and the two protrusions of the second component are received in the two accommodating slots of the two adjacent first components; the first component abuts against the adjacent first component; the first component and the second component are capable of pivoting in response to bending of the case to make the first component move away from the connecting part, such that the connecting part and the curved part gradually separate from the accommodating slot until the protrusion abuts against a side wall of the accommodating slot of the corresponding first component.

11. The electronic device as claimed in claim 10, wherein the protrusion abuts against the side wall of the accommodating slot of the corresponding first component; the first component and the second component are capable of pivoting in response to bending of the case to make the first component move away from the protrusion, such that the connecting part, the two curved parts, and the two protrusions of the second component be gradually received in the two accommodating slots of the two adjacent first components until the first component abuts against the adjacent first component.

* * * * *